United States Patent [19]
Dewis et al.

[11] Patent Number: 6,142,731
[45] Date of Patent: Nov. 7, 2000

[54] LOW THERMAL EXPANSION SEAL RING SUPPORT

[75] Inventors: David W. Dewis, San Diego; Boris Glezer, Del Mar, both of Calif.

[73] Assignee: Caterpillar Inc., Peoria, Ill.

[21] Appl. No.: 08/897,850

[22] Filed: Jul. 21, 1997

[51] Int. Cl.$^7$ ..................................................... F01D 11/08
[52] U.S. Cl. .......................... 415/136; 415/116; 415/117; 415/173.1; 415/173.3; 60/39.32; 60/39.75; 277/416; 277/421; 277/422; 277/931
[58] Field of Search ..................................... 415/134, 136, 415/138, 139, 173.1, 173.3, 115, 116, 117; 60/39.32, 39.75; 403/28–30; 277/411, 416, 421, 422, 931, 943

[56] References Cited

U.S. PATENT DOCUMENTS

| | | | |
|---|---|---|---|
| 3,860,358 | 1/1975 | Cavicchi et al. | 415/134 |
| 4,251,185 | 2/1981 | Karstensen | 415/136 |
| 4,398,866 | 8/1983 | Hartel et al. | 415/173.1 |
| 4,754,983 | 7/1988 | Kruger | 277/422 |
| 4,759,687 | 7/1988 | Miraucourt et al. | 415/138 |
| 5,088,888 | 2/1992 | Bobo | 415/134 |
| 5,181,827 | 1/1993 | Pellow et al. | 415/173.3 |

FOREIGN PATENT DOCUMENTS

| | | | |
|---|---|---|---|
| 2540938 | 8/1984 | France | 415/173.3 |
| 721453 | 1/1955 | United Kingdom | 415/134 |
| 790854 | 2/1958 | United Kingdom | 415/136 |
| 1020900 | 2/1966 | United Kingdom | 415/136 |

*Primary Examiner*—Christopher Verdier
*Attorney, Agent, or Firm*—Larry G. Cain

[57] ABSTRACT

Today, the trend is to increase the temperature of operation of gas turbine engines. To cool the components with compressor discharge air, robs air which could otherwise be used for combustion and creates a less efficient gas turbine engine. The present low thermal expansion sealing ring support system reduces the quantity of cooling air required while maintaining life and longevity of the components. Additionally, the low thermal expansion sealing ring reduces the clearance "C","C'" demanded between the interface between the sealing surface and the tip of the plurality of turbine blades. The sealing ring is supported by a plurality of support members in a manner in which the sealing ring and the plurality of support members independently expand and contract relative to each other and to other gas turbine engine components.

11 Claims, 4 Drawing Sheets

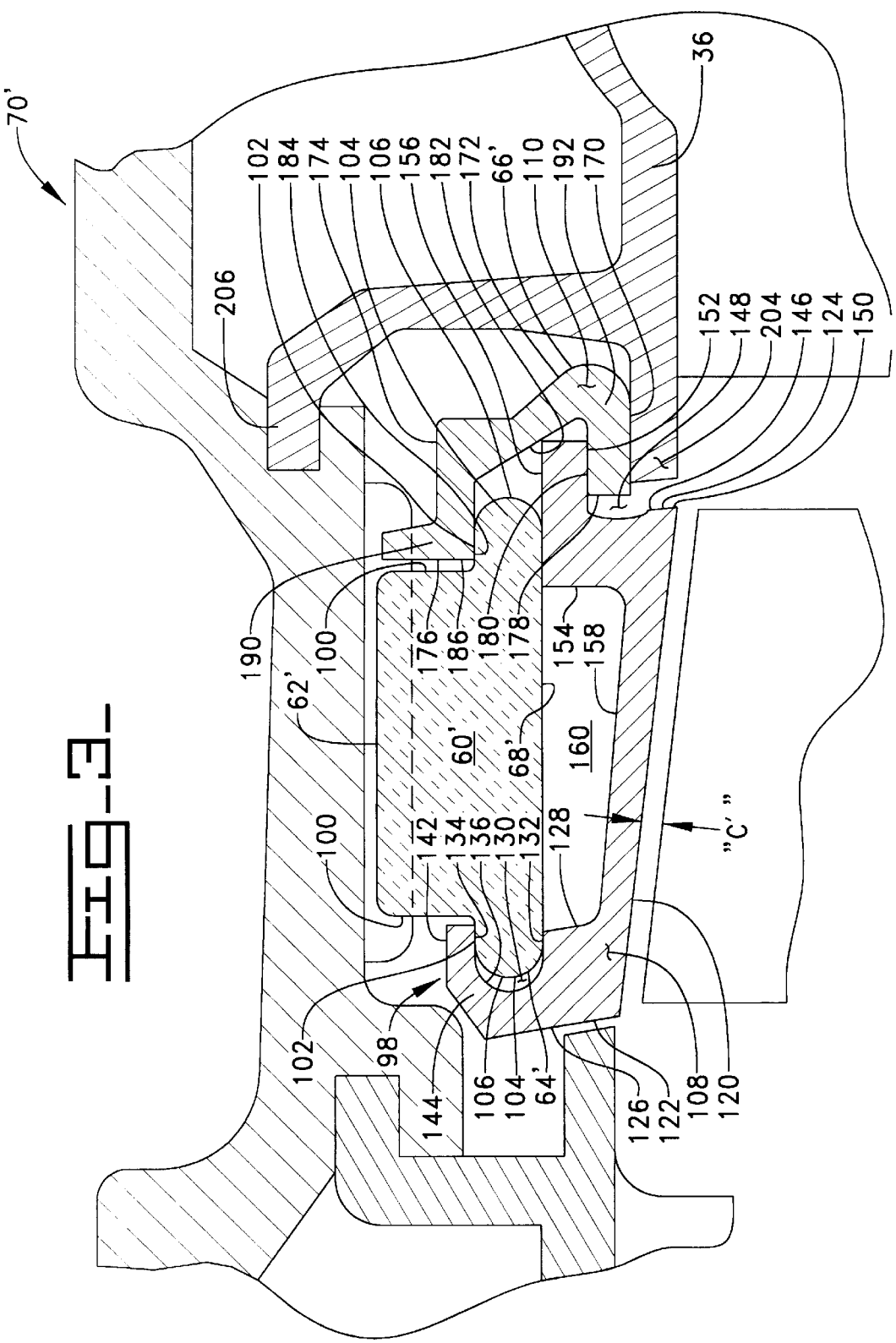

Fig_4_
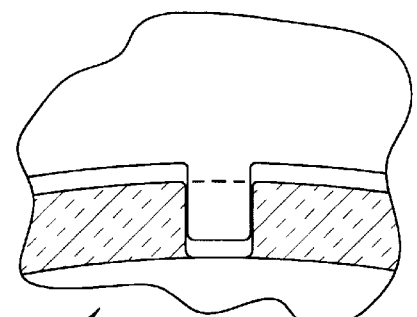
Fig_5_
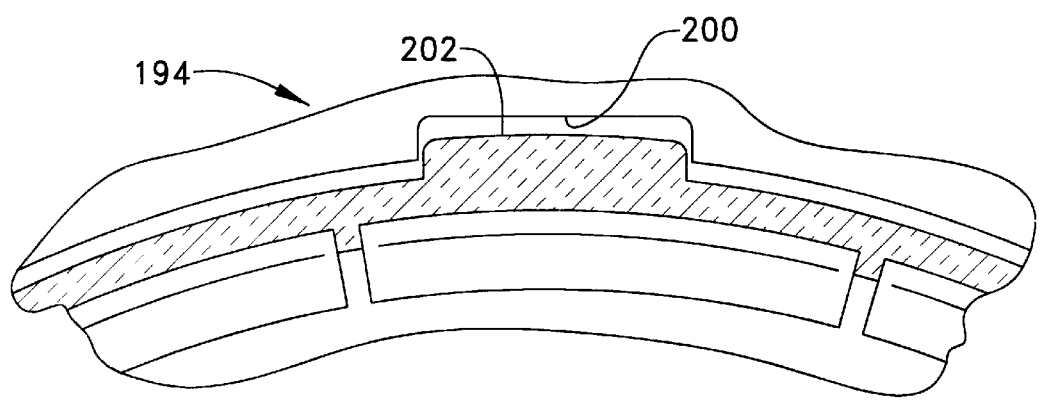
Fig_6_
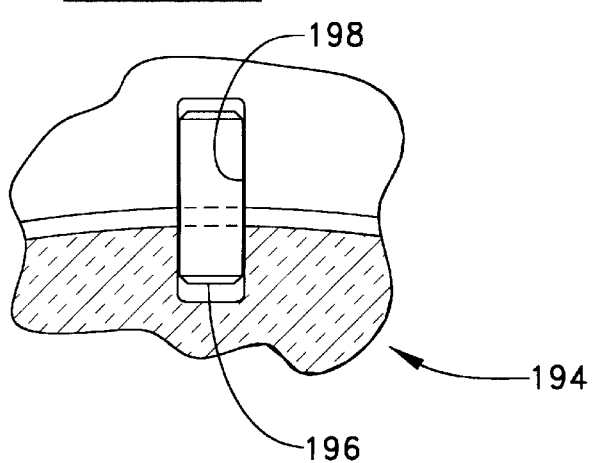

LOW THERMAL EXPANSION SEAL RING SUPPORT

"The Government of the United States of America has rights In this invention pursuant to Contract No. DE-FC21-95MC31173 awarded by the U.S. Department of Energy."

TECHNICAL FIELD

This invention relates generally to a gas turbine engine and more particularly to a system for attaching a low thermal expansion ring for sealing radially about a turbine wheel.

BACKGROUND ART

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a nozzle which directs the hot gas to a turbine blade, delivering up some of its energy to drive the turbine and produce mechanical power.

In order to increase efficiency, the nozzle has a preestablished aerodynamic contour. The axial turbine consists of one or more stages, each employing one row of stationary nozzle guide vanes and one row of moving blades mounted on a turbine disc. The aerodynamically designed nozzle guide vanes direct the gas against the turbine blades producing a driving torque and thereby transferring kinetic energy to the blades.

The gas flow typically entering through the nozzle is directed to the turbine at an entry temperature from 1850 degrees to at least 2200 degrees Fahrenheit. Since the efficiency and work output of the turbine engine are related to the entry temperature of the incoming gases, there is a trend in gas turbine engine technology to increase the gas temperature. A consequence of this is that the range of temperature gradients between starting, operating and stopping increases and the relative expansion between the sealing ring and the turbine blade must be compensated therefor.

Additionally, a seal ring is positioned about the turbine disc and moving blades. The seal ring thermally expands and contracts depending on the current temperature. To compensate for the relative thermal expansion, such as starting and stopping, a clearance or space is typically spaced between the tip of the turbine blade or rotor seal and the stationary seal ring. The larger the clearance between the seal ring and the turbine blades, the less efficient the combination. However, if the clearance between the turbine blades and the seal ring is not maintained, the blade tips will rub and interfere with the seal ring causing structural failure of the components.

Historically, nozzle guide vanes, turbine blades and sealing rings have been made of metals such as high temperature steels and, more recently, nickel alloys. In most of these applications, it has been found necessary to provide internal cooling passages in order to prevent melting. The use of ceramic coatings can enhance the heat resistance of nozzle guide vanes and blades. In specialized applications, nozzle guide vanes and blades are being made entirely of ceramic, thus, imparting resistance to even higher gas flow entry temperatures.

Ceramic materials are superior to metals in the high-temperature application due to a low linear thermal expansion coefficient.

When a ceramic structure is used to replace a metallic part or is combined with a metallic one, it is necessary to avoid excessive thermal stress generated by uneven temperature distribution or the difference between their linear thermal expansion coefficients. The ceramic's different chemical composition, physical properties and coefficient of thermal expansion to that of a metallic supporting structure result in undesirable stresses. A large portion of the undesirable stresses is thermal stress. Thermal stress will be set up either in the nozzle guide vanes, blades and/or sealing ring and between the nozzle guide vanes, blades and/or sealing ring and their supports when the engine is operating.

Furthermore, conventional nozzle, blade and sealing ring designs which are made from metallic material are capable of absorbing or resisting these thermal stresses. The chemical composition of ceramic nozzles, blades and sealing rings do not have the characteristics to absorb or resist high thermal stresses, which are tensile in nature.

The present invention is directed to overcome one or more of the problems as set forth above.

DISCLOSURE OF THE INVENTION

In one aspect of the invention, a gas turbine engine is defined by a plurality of components including a housing, defining a central axis, a compressor section and a turbine section. The turbine section includes a plurality of nozzle members and a turbine defining a turbine disc having a plurality of turbine blades attached to the extremity thereof. The gas turbine engine is comprised of a sealing ring supported within the housing. The sealing ring defines a generally circular cylindrical construction having a thermal expansion rate being less than that of the components of the gas turbine engine. A plurality of support members are attached to the housing and supportingly position the sealing ring radially within the housing. The supportingly position of the sealing ring is free to move radially independent of the plurality of support members. An antirotation means is interposed the sealing ring and the housing. And, the plurality of nozzle members axially position the sealing ring within the engine.

In another aspect of the invention, a sealing ring support system wherein the sealing ring defines a generally circular cylindrical construction having an outer surface, a first side, a second side and an inner surface is disclosed. The first side and the second side have a plurality of radial grooves therein. The sealing ring support system is comprised of a plurality of support members supportingly positioning the sealing ring radially. The plurality of support members have a preestablished rate of thermal expansion. The sealing ring has a thermal expansion rate being less than that of the plurality of support members and is free to move radially independent of said plurality of support members.

In another aspect of the invention, a sealing ring support system wherein the sealing ring defines a generally circular cylindrical construction has an outer surface, a first side, a second side and an inner surface. The first side and said second side has a protrusion defined thereon. The sealing ring support system is comprised of a plurality of support members which supportingly position the sealing ring radially. The plurality of support members have a preestablished rate of thermal expansion and the plurality of support members include a plurality of first retainers positioned on one of the first side and the second side and a plurality of second retainers positioned on an other of the first side and the second side. The sealing ring has a thermal expansion rate being less than that of the plurality of support members and is free to move radially independent of the plurality of support members.

BRIEF DESCRIPTION OF THE DRAWINGS

FIG. 3 is an enlarged sectional view of an alternate embodiment;

FIG. 4 is an enlarged sectional view of the present invention as taken along line 4—4 of FIG. 2;

FIG. 5 is an enlarged sectional view of the present invention as taken along line 5—5 of FIG. 3; and FIG. 6 is an enlarged sectional view of an alternate embodiment.

BEST MODE FOR CARRYING OUT THE INVENTION

Figure 1:
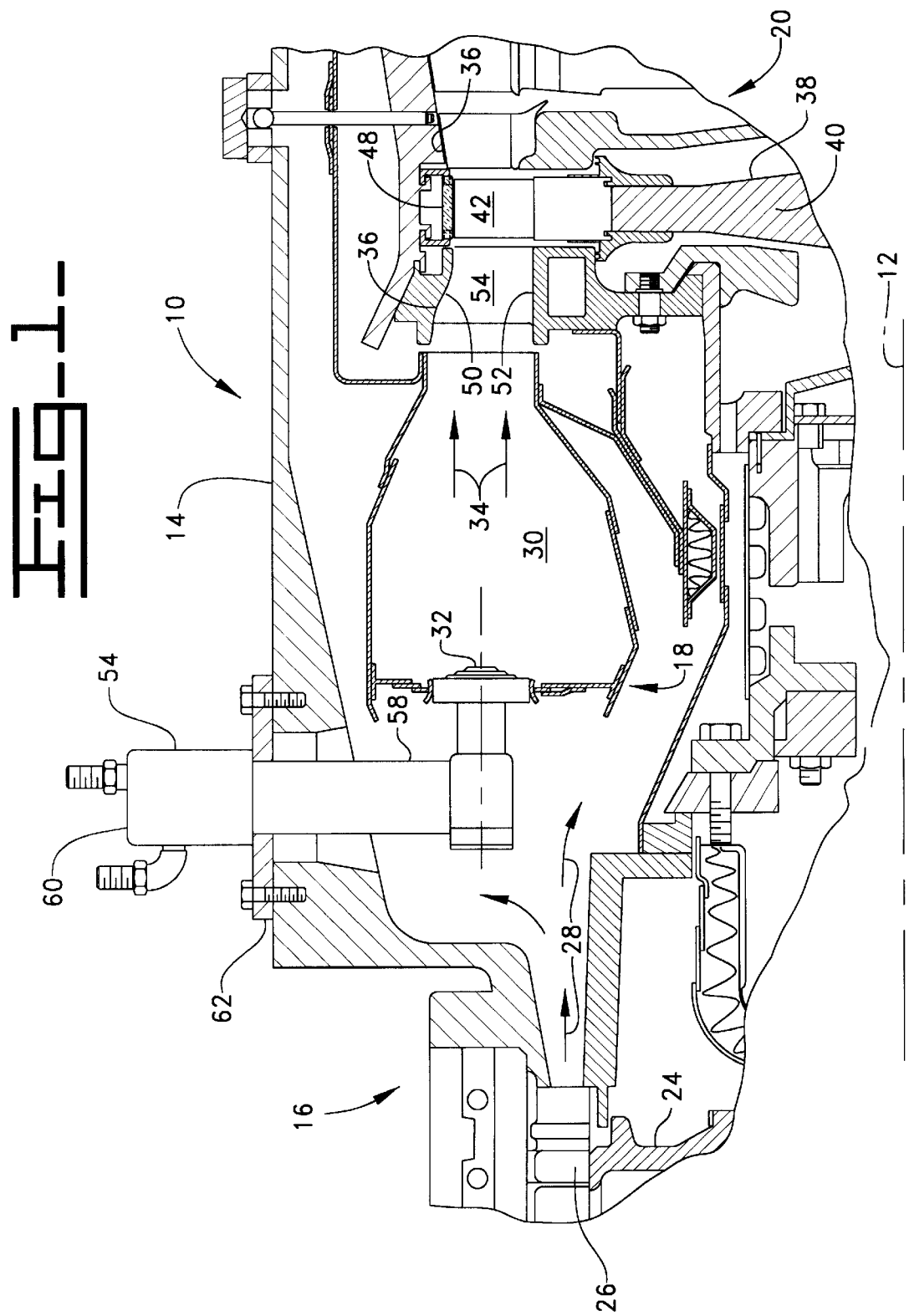
FIG. 1 is a partially sectioned side elevational view of a gas turbine engine embodying the present invention.

Referring to FIG. 1, a gas turbine engine 10 is shown. The gas turbine engine 10 defines a central axis 12 and includes a housing 14 having a compressor section 16 operatively connected to a combustor section 18 positioned within the housing 12. A turbine section 20 is operatively connected to the combustor section 18 and is disposed within the housing 14.

The compressor section, in this application includes an axial compressor 24 having a plurality of rotating blades 26 compressively supplying a compressed fluid, as indicated by the arrows 28, to the combustor section 18. The combustor section 18 includes a combustion chamber 30 having a plurality of fuel injector 32, only one shown, positioned therein. The plurality of fuel injectors 32 supply a combustible fuel, not shown, to the combustion chamber 30. Within the combustion chamber 30, fuel and the compressed fluid 28 are mixed, burned and form a power generating fluid, as indicated by the arrows 34. The power generating fluid 34 is functionally directed to the turbine section 20. The turbine section 20 includes a plurality of nozzle members 36 positioned adjacent the combustion chamber 30 and a turbine 38 rotatably positioned within the housing 14 and downstream from the plurality of nozzle members 36. The turbine 38 includes a turbine disc 40 rotatably positioned about the central axis 12. The turbine 38 further includes a plurality of turbine blades 42 attached to the turbine disc 40 at its extremity.

The turbine 38 and each of the plurality of nozzle members 36 are of generally conventional construction which includes a plurality of seal members 48 and an outer mounting structure 50 being attached to the housing 14 in a conventional manner. And, an inner mounting structure 52 having a blade portion 54 interconnected with the outer mounting structure 50. The blade portion 54 has a preestablished configuration.

Figure 2:
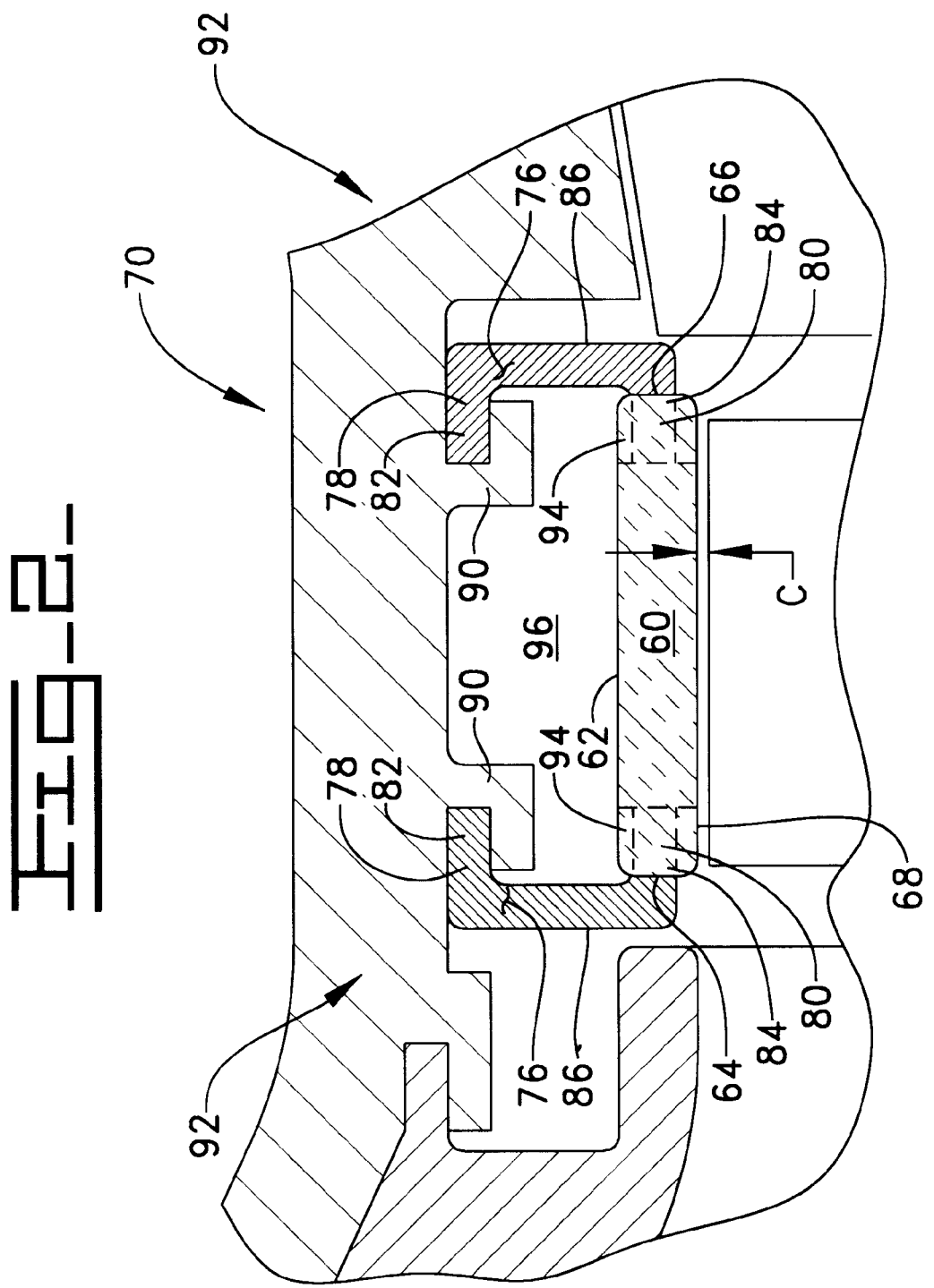
FIG. 2 is an enlarged sectional view of a portion of the gas turbine engine embodying the present invention.

As best shown in FIG. 2, downstream of a portion of the plurality of nozzle members 36 and radially spaced from the turbine blades 42 a preestablished distance is a sealing ring 60. The sealing ring 60, in this application, is of a continuous generally circular cylindrical construction. The sealing ring 60 is made of a low thermal expansion material as compared to the thermal expansion rate of the plurality of nozzle members 36. In this application the sealing ring 60 is made of a ceramic material. As a further alternative, the plurality of nozzle members 36 and the sealing ring 60 could have a low thermal expansion rate as compared to the housing 14. The sealing ring 60 defines an outer surface 62 being interposed a first side 64 and a second side 66. The sealing ring 60 further defines an inner surface or a sealing surface 68 being interposed the first side 64 and the second side 66 and is spaced from the outer surface 62. The spacing of the inner surface 68 from the plurality of turbine blades 42 forms a clearance "C" having a preestablished distance. The sealing ring 60 is supported within the housing 14 by a plurality of support members 70. Each of the plurality of support members 70 are attached to one of the first side 64 and the second side 66 as will be defined further in this application.

The plurality of support members 70 include a plurality of hanger brackets 76 disposed radially within the housing 14. Each of the plurality of hanger brackets 76 include a first end 78 attached to the housing 14. And, a second end 80 attached to the sealing ring 60. The first end 78 includes a first axial portion 82 and the second end 80 includes a second axial portion 84. Interposed the first axial portion 82 and the second axial portion 84 is a radial portion 86. In this application, each of the plurality of support brackets 70 and the plurality of hanger brackets 76, if cross-sectioned, have a generally channel configuration. As further shown in FIG. 2, the housing 14 includes a mounting structure 90 which with the plurality of support members 70 form a hook or tongue and groove 92 configuration. Positioned in each of the first side 64 and the second side 66 of the sealing ring 60 is a plurality of radial grooves 94. In this application, three radial grooves 94 are used and are equally spaced about the circular cylindrical construction. As an alternative, more than three radial grooves 94 could be used. A cavity 96 is formed between the housing 14, the plurality of hanger brackets 76 and the sealing ring 60. Positioned downstream of the sealing ring 60 and the plurality of hanger brackets 76 is another one of the plurality of nozzle members 36.

FIG. 3 shows an alternate embodiment or configuration; however, the gist of the invention remains unchanged. In this embodiment it is to be understood that like reference numerals indicate like structure and that primed (') references numerals indicate structures that are similar to but modified as compared to structures defined by the reference numeral alone. Downstream of the plurality of nozzle members 36 and radially spaced from the turbine blades 42 is a sealing ring 60'. The sealing ring 60', in this embodiment, is of a continuous generally circular cylindrical construction. The sealing ring 60' is made of a low thermal expansion material as compared to the thermal expansion rate of the plurality of nozzle members 36. In this application, the sealing ring is made of a ceramic material. As a further alternative, the plurality of nozzle members 36 and the sealing ring 60' could have a lower thermal expansion rate as compared to the housing 14. The sealing ring 60' defines an outer surface 62' being interposed a first side 64' and a second side 66'. The sealing ring 60' further defines an inner surface 68' being interposed the first side 64' and the second side 66'. The sealing ring 60' is supported within the housing 14 by a plurality of support members 70'. Each of the plurality of support members 70' are attached to one of the first side 64' and the second side 66' as will be defined below. As shown by a cross-section through the sealing ring 60', each of the first side 64' and the second side 66' have a protrusion 98 defined thereon. The protrusion 98 is defined by a first radial portion 100 extending inwardly from the outer surface 62'. An axial portion 102 extends outwardly away from the corresponding first and second sides 64', 66'. The axial portion 102 intersects with a second radial portion 104 which extends radially outwardly from the inner surface 68'.

Each of the intersection include a radiused portion 106. The axial portion 102, the second radial portion 104 and a portion of the inner surface 68' define the protrusion 98 on each of the first side 64' and the second side 66'.

In this embodiment, the plurality of support members 70' include a plurality of first retainers 108 being attached to the first side 64' of the sealing ring 60' and a plurality of second retainers 110 being attached to the second side 66' of the sealing ring 60'.

Each of the plurality of first retainers 108 is defined by a sealing surface 120 being positioned in spaced relationship and opposite to the plurality of turbine blades 42. The spaced relationship forms the clearance "C'". Each of the plurality of first retainers 108 further include a first side portion 122 being directed upstream toward the flow of the power generating fluid 34 and a second side portion 124 being spaced from the first side portion 122 a predetermined distance. The first side portion 122 includes an outer surface 126 which radially extends outward from the sealing surface 120. The first side portion 122 also includes an inner surface 128 having a groove 130 positioned therein. The groove 130 includes a first axial surface 132 and a second axial surface 134 being spaced outward from the first axial surface 132. A semicircular surface 136 connects the first axial surface 132 and the second axial surface 134. The first side portion 122 defines a first axial surface 142 being positioned opposite the sealing surface 120. The combination of the groove 130, the axial surface 142 and a portion of the inner surface 128 forms a first hook portion 144. The second side portion 124 includes an outer surface 146 which radially extends outward from the sealing surface 120. A notch 148 is positioned in the outer surface 146. The notch 148 is positioned between a radial leg 150 extending outward from the sealing surface 120 and an axial leg 152. The second side portion 124 further includes an inner surface 154 and a second axial surface 156 being positioned opposite the sealing surface 120. The second axial surface 156 is axially aligned with the first axial surface 132. Spaced from the sealing surface 120 a predetermined distance is a cooling surface 158. The cooling surface 158 is positioned radially inward of the first axial surface 132 of the groove 130 and the second axial surface 156 of the second side portion 124. The cooling surface 158, the inner surface 128 of the first side portion 122 and the inner surface 154 of the second side portion 124 form a cavity 160.

Each of the plurality of second retainers 110 include a first axial surface 170 being positioned adjacent the turbine blades 42. An outer surface 172 extends radially outward from the axial surface 170 and in this application has a irregular contour. A second generally axial surface 174 extends from the outer surface 172 toward an inner surface 176. The inner surface 176 includes a first radial leg 178 extending outwardly from the first axial surface 170 a predetermined distance. A third axial surface 180 extends from the first radial leg 178 toward the outer surface 172 a predetermined distance. A second radial leg 182 extends outward from the third axial surface 180 a predetermined distance and connects with a fourth axial surface 184. Extending radially outward from the fourth axial surface 184 to the second axial surface 174 is a third radial leg 186. In this application, the fourth axial surface 184 is axially aligned with the second axial surface 134 of the groove 130. The second axial surface 174, the third radial leg 186 and the fourth axial surface 184 form a first hook portion 190 and the first axial surface 170, the first radial leg 178 and the third axial surface 180 forming a second hook portion 192 of the individual second retainers 110.

As best shown in FIGS. 4, 5 and 6, each of the embodiments, includes a convention antirotational means 194. The antirotational means 194 could include a pin 196 and a bore 198 or slot being positioned in one or the other of the sealing ring 60,60' and the housing 14. Or a notch or groove 200 and a protrusion 202 in one or the other of the sealing ring 60,60' and the housing 14. Or as a further alternative, the antirotational means 194 could include the plurality of support members positioned in such a manner as to prevent rotation of the sealing ring 60,60'.

As shown in FIG. 3, with the alternate embodiment, the another one of the plurality of nozzle members 36 positioned downstream of the sealing ring 60 and the plurality of hanger brackets 76 includes a first hook 204 being in supporting relationship with the respective second retainer 110 and a second hook 206 being in supporting relationship with the housing 14.

INDUSTRIAL APPLICABILITY

In operation, the gas turbine engine 10 is started from the cold condition. In the cold condition, thermal expansion of the components is typically at a minimum and the clearance "C","C'" is at a maximum. As the gas turbine engine 10 increases in temperature, the components also increase in temperature and the clearance "C","C'" moves from the maximum toward the steady state value. For example, in the turbine section 20 the turbine disc 40 expands radially outward from the axis 12 and the plurality of turbine blades 42 also expand radially outward away from the axis 12 toward the sealing ring 60,60'. At the same time, the sealing ring 60,60' and the plurality of support members 70,70' expand radially outward often reducing the clearance "C", "C'" if the thermal expansion of the seal ring 60,60' and the plurality of support members 70,70' is lower than that of the turbine disc 40 and the turbine blades 42. The most severe conditions are experienced during shutdown followed by hot restart. For example, the clearance "C","C'" are reduced to there minimum as a result of the turbine disc 40 and the turbine blades 42 not being able to dissipate heat and staying hot for a longer time than that of the sealing ring 60,60' and the plurality of supporting members 70,70'. Thus, any reduction in the thermal expansion will allow the clearance "C","C'" to remain more constant allowing for increased efficiency and increased life.

In the embodiment shown in FIG. 2, the sealing ring 60 is positioned in the housing 14 with the appropriate antirotational means 194 installed. For example, with the antirotation means shown in FIG. 5, the protrusion 202 is positioned in the notch 200. Thus, the sealing ring 60 is free to expand and contract radially but is prevented from rotation. The plurality of hanger brackets 76 are interposed the housing 14 and the sealing ring 60. On the second side 66 of the sealing ring 60, the first end 78 of the individual ones of the plurality of hanger brackets 76 are positioned within the mounting structure 90 of the housing 14. And, the second end 80 of the individual ones of the plurality of hanger brackets 76 are positioned within the corresponding ones of the plurality of radial grooves 94. Thus, the second side 66 of the sealing ring 60 is positioned. The first end 78 of the individual ones of the plurality of hanger brackets 76 are positioned within the mounting structure 90 of the housing 14. And, the second end 80 of the individual ones of the plurality of hanger brackets 76 are positioned within the corresponding ones of the plurality of radial grooves 94.

Thus, the first side 64 and the second side 66 of the sealing ring 60 is positioned and the sealing ring 60 is supported.

Corresponding ones of the plurality of nozzle members 36 retain the sealing ring 60 and the second ends 80 of the plurality of hanger brackets 76 in axial position. And, the corresponding ones of the plurality of nozzle members 36 retain the first end 78 of the plurality of hanger brackets 76 and the mounting structure 90 of the housing 14 in axial position. Thus, the sealing ring 60 is positioned axially and radially; but, is free to move radially independent of the plurality of hanger brackets 76.

In operation, the plurality of hanger brackets 76 thermally expand to a greater extend than does the sealing ring 60. However, since the second end 80 of the individual ones of the plurality of hanger brackets 76 are positioned within the corresponding ones of the plurality of radial grooves 94 the second end 80 and the sealing ring 60 are free to move independently and expand at different rates. Thus, the clearance "C" is retained tighter and less variation of the clearance "C" occurs. For example, the sealing ring 60 expands very little and the major expansion takes place in the turbine disc 40 and the plurality of turbine blades 42.

To further reduce the thermal expansion, a portion of the compressed fluid 28 from the compressor section 16 is directed into the cavity 96. This compressed fluid 28 is used to cool the sealing ring 60 by cooling the outer surface 62 of the sealing ring 60 and the plurality of support members 70 further reducing thermal variation and clearance "C" variables.

In the embodiment shown in FIG. 3, the sealing ring 60' is positioned in the housing 14. The plurality of support members 70' are interposed the housing 14 and the sealing ring 60'. With the plurality of nozzle members 36 downstream of the turbine 38 installed in the housing 14, the plurality of second retainers 110 are positioned within the first hook 204 of the plurality of nozzle members 36 with the axial surface 170 of each second retainer 110 contacting the hook 204. The sealing ring 60' is positioned in the housing 14 with the appropriate antirotational means 194 installed. For example, with the antirotation means shown in FIG. 5, the protrusion 202 is positioned in the notch 200. Thus, the sealing ring 60' is free to expand and contract radially but is prevented from rotation. The axial portion 102 of the second side 66' is positioned in contacting relationship with the fourth axial surface 184 of the respective one of the plurality of second retainers 110. And, the plurality of first retainers 108 are positioned about the sealing ring 60'. For example, the axial leg 152 of the notch 148 is positioned in contacting relationship with the third axial surface 180 of the respective second retainer 110. This also results in the second axial surface 156 of the respective second retainer 110 being in contacting relationship with the inner surface 68' of the sealing ring 60'. As the second side portion 124 is being positioned as described above, the groove 130 of the respective one of the plurality of first retainers 108 is positioned about the protrusion 98 on the first side 64' of the sealing ring 60'. This also results in the protrusion 98 on the second side 66' of the sealing ring 60' being axially positioned within the respective first retainer 108 and the second retainer 110.

Thus, the first side 64' and the second side 66' of the sealing ring 60' is positioned and the sealing ring 60' is supported. Corresponding ones of the plurality of nozzle members 36' retain the sealing ring 60', the plurality of first retainers 108 and the plurality of second retainers 110 in axial position. Thus, the sealing ring 60' is positioned axially and radially; but, is free to move radially independent of the plurality of support members 70'.

In operation, the plurality of support members 70' thermally expand to a greater extend than does the sealing ring 60'. However, since the sealing ring 60', in reality, supports the plurality of first retainers 108 and the plurality of second retainers 110 the thermal conductivity to the plurality of retainers 108,110 is reduced. This results in the plurality of first and second retainers 108, 110 from absorbing and retaining heat. Which consequently, results in less thermal expansion, a reduced clearance "C'" and greater efficiency. Thus, the sealing ring 60', the plurality of first retainers 108 and the plurality of second retainers are free to move independently and expand at different rates. Thus, the clearance "C'" is retained tighter and less variation of the clearance "C'" occurs. For example, the sealing ring 60' expands very little and the major expansion takes place in the turbine disc 40 and the plurality of turbine blades 42.

To further reduce the thermal expansion, a portion of the compressed fluid 28 from the compressor section 16 is directed into the cavity 160. This compressed fluid 28 is used to cool the cooling surfaces 158 and consequently the sealing surfaces 120 of plurality of first retainers 108 further reducing thermal variation and the clearance "C'" variables.

Thus, the low thermal expansion sealing ring 60,60' and the plurality of supporting members 70,70' used to support the sealing ring 60,60' reduce the unwanted clearance "C", "C'", improve efficiency and effectiveness.

Other aspects, objects and advantages of this invention can be obtained from a study of the drawings, the disclosure and the appended claims.

What is claimed is:

1. A sealing ring support system wherein said sealing ring defining a generally circular cylindrical construction having an outer surface, a first side, a second side and an inner surface, said first side and said second side having a protrusion defined thereon, said sealing ring support system comprising:

a plurality of support members supportingly positioning said sealing ring radially, said plurality of support members having a preestablished rate of thermal expansion and said plurality of support members including a plurality of first retainers being positioned on one of said first side and said second side and a plurality of second retainers being positioned on another of said first side and said second side, said plurality of first retainers include a groove being positioned about said protrusion on said first side of said sealing ring, a sealing surface, a first side portion extending from said sealing surface, a second side portion being spaced from said first side portion and extending from said sealing surface, said first side portion defining an inner surface and said groove being positioned within said inner surface and said second side portion having a notch defined therein forming a tongue on the second side portion and said plurality of second retainers includes a first axial surface, an outer surface extending from said first axial surface, a second axial surface extending from said outer surface, and an inner surface, said inner surface includes a first radial leg extending from said first axial surface, a third axial surface extending from said first radial leg, a second radial leg extending from said third axial surface, a fourth axial surface and a third radial leg extending between said fourth axial surface and said second axial surface;

said sealing ring having a thermal expansion rate being less than that of the plurality of support members and being free to move radially independent of said plurality of support members.

2. The sealing ring support system of claim 1 being adapted for use with a gas turbine engine having a compressor section, a cavity being positioned adjacent said sealing ring and being adapted to cool said sealing ring during operation of said gas turbine engine with a portion of a compressed fluid being supplied by said compressor section.

3. The sealing ring support system of claim 1 wherein said plurality of support members being supported by a plurality of hooks.

4. The sealing ring support system of claim 1 including an antirotation means which includes a protrusion being positioned in one of said sealing ring and a housing and a notch being positioned in said other one of said sealing ring and said housing.

5. The sealing ring support system of claim 1 wherein said plurality of support members having a generally channel configuration defining with said sealing ring a tongue and groove and being supportingly positioned on each of said first side and said second side.

6. The sealing ring support system of claim 1 wherein said third axial surface being in contacting relationship with said notch and said fourth axial surface being in contacting relationship with said protrusion.

7. The sealing ring support system of claim 1 wherein said plurality of second retainers include a hook.

8. The sealing ring support system of claim 1 wherein said plurality of first retainers and said sealing ring forming a cavity.

9. The sealing ring support system of claim 1 wherein said sealing ring further includes one of a groove and a protrusion.

10. The sealing ring support system of claim 9 wherein said one of said groove and said protrusion in the assembled position being adapted as an antirotation means.

11. The sealing ring support system of claim 1 including an antirotation means which includes a protrusion being positioned in one of said sealing ring and said plurality of support members and a notch being positioned in said other one of said sealing ring and said plurality of support members.

* * * * *

UNITED STATES PATENT AND TRADEMARK OFFICE
CERTIFICATE OF CORRECTION

PATENT NO.    : 6,142,731
DATED         : November 7, 2000
INVENTOR(S)   : David W. Dewis et al.

Page 1 of 1

It is certified that error appears in the above-identified patent and that said Letters Patent is hereby corrected as shown below:

<u>Title page,</u>
Item [73] Assignee:, change "Caterpillar Inc., Peoria, Ill." to -- "Solar Turbines Incorporated, San Diego, CA"

Signed and Sealed this

Twenty-eighth Day of May, 2002

*Attest:*

*Attesting Officer*

JAMES E. ROGAN
*Director of the United States Patent and Trademark Office*